(12) United States Patent
Downs et al.

(10) Patent No.: US 10,486,467 B2
(45) Date of Patent: Nov. 26, 2019

(54) AXLE ASSEMBLY WITH OUTBOARD AXLE BEARINGS

(71) Applicant: American Axle & Manufacturing, Inc., Detroit, MI (US)

(72) Inventors: James P. Downs, South Lyon, MI (US); Paul J. Valente, Berkley, MI (US)

(73) Assignee: AMERICAN AXLE & MANUFACTURING, INC., Detroit, MI (US)

( * ) Notice: Subject to any disclaimer, the term of this patent is extended or adjusted under 35 U.S.C. 154(b) by 321 days.

(21) Appl. No.: 15/592,231

(22) Filed: May 11, 2017

(65) Prior Publication Data

US 2017/0239989 A1    Aug. 24, 2017

Related U.S. Application Data

(63) Continuation-in-part of application No. 14/663,479, filed on Mar. 20, 2015, now Pat. No. 9,649,882.

(51) Int. Cl.
*B60B 35/18* (2006.01)
*B60B 35/14* (2006.01)
(Continued)

(52) U.S. Cl.
CPC .......... *B60B 35/18* (2013.01); *B60B 27/0021* (2013.01); *B60B 27/0073* (2013.01); *B60B 27/0078* (2013.01); *B60B 27/06* (2013.01); *B60B 35/14* (2013.01); *B60B 35/16* (2013.01); *F16C 19/386* (2013.01); *F16H 57/023* (2013.01); *F16H 57/037* (2013.01); *G01P 3/443* (2013.01); *G01P 3/487* (2013.01); *B60B 27/001* (2013.01); *B60B 35/125* (2013.01);
(Continued)

(58) Field of Classification Search
CPC ..... B60B 35/18; B60B 35/16; B60B 2320/10; F16H 57/037
See application file for complete search history.

(56) References Cited

U.S. PATENT DOCUMENTS 1,422,647 A    7/1922    Zimmerman
1,766,922 A    6/1930    Moorhouse
(Continued)

FOREIGN PATENT DOCUMENTS

CN    201334012 Y    10/2009

OTHER PUBLICATIONS

"Spicer Axle Maintenance Manual—Model 30—Front and Rear Carrier Type", Spicer Axle Division, Dana Corporation, apparent publication date of Feb. 1984. See, e.g., Figure 76 and pp. 21 and 25-27 relating to the tapered roller bearings and seal that are mounted to the axle shaft of the rear axle.

*Primary Examiner* — Sherry L Estremsky
(74) *Attorney, Agent, or Firm* — Harness, Dickey & Pierce, P.L.C.

(57) ABSTRACT

An axle assembly having an axle housing, an axle shaft, a plurality of axle shaft bearings and a seal. The axle housing has a tubular member and an end flange that is coupled to the tubular member. The axle shaft bearings and the seal are received in the end flange and are engaged to the axle shaft. The axle shaft bearings support the axle shaft for rotation relative to the axle housing. The seal is sealingly engaged to the end flange and the axle shaft. A method for assembling an axle assembly is also provided.

22 Claims, 6 Drawing Sheets

(51) Int. Cl.
*B60B 35/16* (2006.01)
*B60B 27/00* (2006.01)
*F16H 57/037* (2012.01)
*F16H 57/023* (2012.01)
*G01P 3/44* (2006.01)
*G01P 3/487* (2006.01)
*B60B 27/06* (2006.01)
*F16C 19/38* (2006.01)
*B60B 35/12* (2006.01)

(52) U.S. Cl.
CPC ....... *B60B 2320/10* (2013.01); *B60B 2380/90* (2013.01); *B60B 2900/113* (2013.01); *B60B 2900/211* (2013.01); *B60Y 2200/14* (2013.01); *F16C 2326/02* (2013.01)

(56) References Cited

U.S. PATENT DOCUMENTS

| | | | | |
|---|---|---|---|---|
| 2,158,235 | A | | 5/1939 | Griswold |
| 2,533,093 | A | | 12/1950 | Clark |
| 2,647,597 | A | * | 8/1953 | Keese .................. B60K 5/04 180/374 |
| 2,776,583 | A | * | 1/1957 | Williams ............... F16H 3/32 180/76 |
| 2,890,772 | A | * | 6/1959 | Bixby .................. F16H 57/031 192/70.13 |
| 3,218,885 | A | * | 11/1965 | Puidokas ............... B60K 17/16 180/339 |
| 3,719,841 | A | * | 3/1973 | Ritsema ................. G01P 3/446 310/155 |
| 5,711,393 | A | * | 1/1998 | Gage .................... B60K 17/16 180/379 |
| 5,735,612 | A | * | 4/1998 | Fox ..................... F16O 19/364 384/448 |
| 6,254,196 | B1 | * | 7/2001 | Gee ..................... B60B 27/00 301/105.1 |
| 6,553,865 | B1 | | 4/2003 | Endreszl |
| 6,957,918 | B2 | | 10/2005 | Beutler et al. |
| 7,233,138 | B2 | | 6/2007 | Michalek et al. |
| 7,448,067 | B2 | | 11/2008 | Yadav |
| 8,092,132 | B2 | | 1/2012 | Zink et al. |
| 8,711,393 | B2 | | 4/2014 | Fukano et al. |
| 9,599,164 | B1 | * | 3/2017 | Rode .................... B60B 31/00 |
| 2008/0121070 | A1 | * | 5/2008 | Krisher ................. B21D 53/90 74/607 |
| 2014/0274544 | A1 | * | 9/2014 | Downs ................... F16H 48/38 475/246 |
| 2014/0302961 | A1 | | 10/2014 | Downs et al. |
| 2015/0033909 | A1 | | 2/2015 | Campbell |

* cited by examiner

AXLE ASSEMBLY WITH OUTBOARD AXLE BEARINGS

CROSS-REFERENCE TO RELATED APPLICATIONS

This application is a continuation-in-part of U.S. application Ser. No. 14/663,479 filed Mar. 20, 2015, the disclosure of which is incorporated by reference as if fully set forth in detail herein.

FIELD

The present disclosure relates to an axle assembly with outboard axle bearings.

BACKGROUND

This section provides background information related to the present disclosure which is not necessarily prior art.

U.S. Patent Publication No. 2014/0302961 discloses an axle assembly having a bearing that directly supports a ring gear for rotation relative to an axle housing. A differential case that is mounted in the axle housing is driven by the ring gear and outputs rotary power to a pair of axle shafts. The axle shafts are supported on their inboard ends by bearings. While such configuration is suited for its intended purposes, there remains a need in the art for a similar type of axle assembly that packages the bearings for the axle shaft in a manner that is easier to assemble.

SUMMARY

This section provides a general summary of the disclosure, and is not a comprehensive disclosure of its full scope or all of its features.

In one form, the present teachings provide an axle assembly that includes an axle housing, an axle shaft, a dust shield mount, a wheel end cover, a seal and first and second axle shaft bearings. The axle housing has a tubular member and an end flange that is fixedly coupled to the tubular member. The end flange defines a central body and a first flange that extends radially outwardly from the central body. The central body defines a through bore, a first flange mount and an outer seal surface. The through bore has first and second bearing bore portions. The first flange mount has a first annular shoulder. The axle shaft defines an inner seal surface, a first bearing mount and a second bearing mount. The dust shield mount is abutted to the first annular shoulder on the first flange mount. The wheel end cover has an annular body and a second flange that extends radially outwardly from the annular body. The second flange abuts the dust shield on a side of the dust shield opposite the first shoulder. The annular body is engaged to the outer seal surface of the central body. The seal is mounted to the annular body of the wheel end cover and sealingly engages the inner seal surface of the axle shaft. The first axle bearing is located on the first bearing mount and the first bearing bore portion. The second axle bearing is located on the second bearing mount and the second bearing bore portion. The first and second axle bearings support the axle shaft for rotation relative to the axle housing.

In another form, the present teachings provide a method for assembling an axle assembly. The method includes: providing a tubular member; coupling a tube end connector to the tubular member; installing a radial seal to a wheel end cover; installing the wheel end cover to an axle shaft such that the radial seal sealingly engages an inner seal surface formed on the axle shaft; installing first and second axle bearings onto the axle shaft; mounting a dust shield mount to a first annular shoulder formed on the tube end connector; and installing the axle shaft through the tube end connector and the tubular member such that the first and second axle bearings are seated into the tube end connector and a flange on the dust shield abuts flanges formed on the wheel end cover and the tube end connector.

In still another form, the present teachings provide an axle assembly that includes an axle housing, a ring gear, a ring gear bearing, a differential assembly, an axle shaft, first and second tapered roller bearings, and a seal. The axle housing has a tubular member and an end flange that is fixedly coupled to the tubular member. The end flange defines a first bearing bore and a second bearing bore. The ring gear is received in the housing and is rotatable about a rotary axis. The ring gear bearing directly supports the ring gear for rotation about the rotary axis. The differential assembly received in the axle housing and has a pair of differential output members. The axle shaft is received thorough the end flange and extends into the tubular member. The axle shaft has a proximal end, which is drivingly engaged to one of the differential output members, and a distal end opposite the proximal end. The distal end includes a first bearing journal, a second bearing journal, a seal interface and a wheel flange. The first bearing journal is disposed along the rotary axis between the second bearing journal and the seal interface. The wheel flange is adapted to abut a wheel that is mounted to the axle shaft for rotation therewith. The seal interface is disposed along the rotary axis between the wheel flange and the first bearing journal. The first tapered roller bearing is received in the first bearing bore and on the first bearing journal, while the second tapered roller bearing is received in the second bearing bore and on the second bearing journal. The first and second tapered roller bearings support the distal end of the axle shaft relative to the end flange for rotation about the rotary axis. The seal is fixedly coupled to the end flange and engages the seal interface on the axle shaft.

In yet another form, the present teachings provide a method for assembling an axle assembly. The method includes: providing an axle housing having a tubular member; mounting a differential assembly in the axle housing for rotation about a rotary axis; providing an axle shaft having a wheel flange formed thereon; assembling a first inner bearing race to the axle shaft; providing an end flange; installing a set of first tapered rollers, a first outer bearing race, a set of second tapered rollers, and a second outer bearing race to the end flange; assembling the end flange to the axle shaft such that first set of tapered rollers are engaged to the first inner and outer bearing races; assembling a second inner bearing race to the axle shaft such that the set of second tapered rollers are disposed between the second inner and outer bearing races; axially preloading the set of first tapered rollers and the set of second tapered rollers; inserting the axle shaft into the tubular member to engage an end of the axle shaft to an output member of the differential assembly and to abut the end flange to the tubular member; and fixedly coupling the end flange to the tubular member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
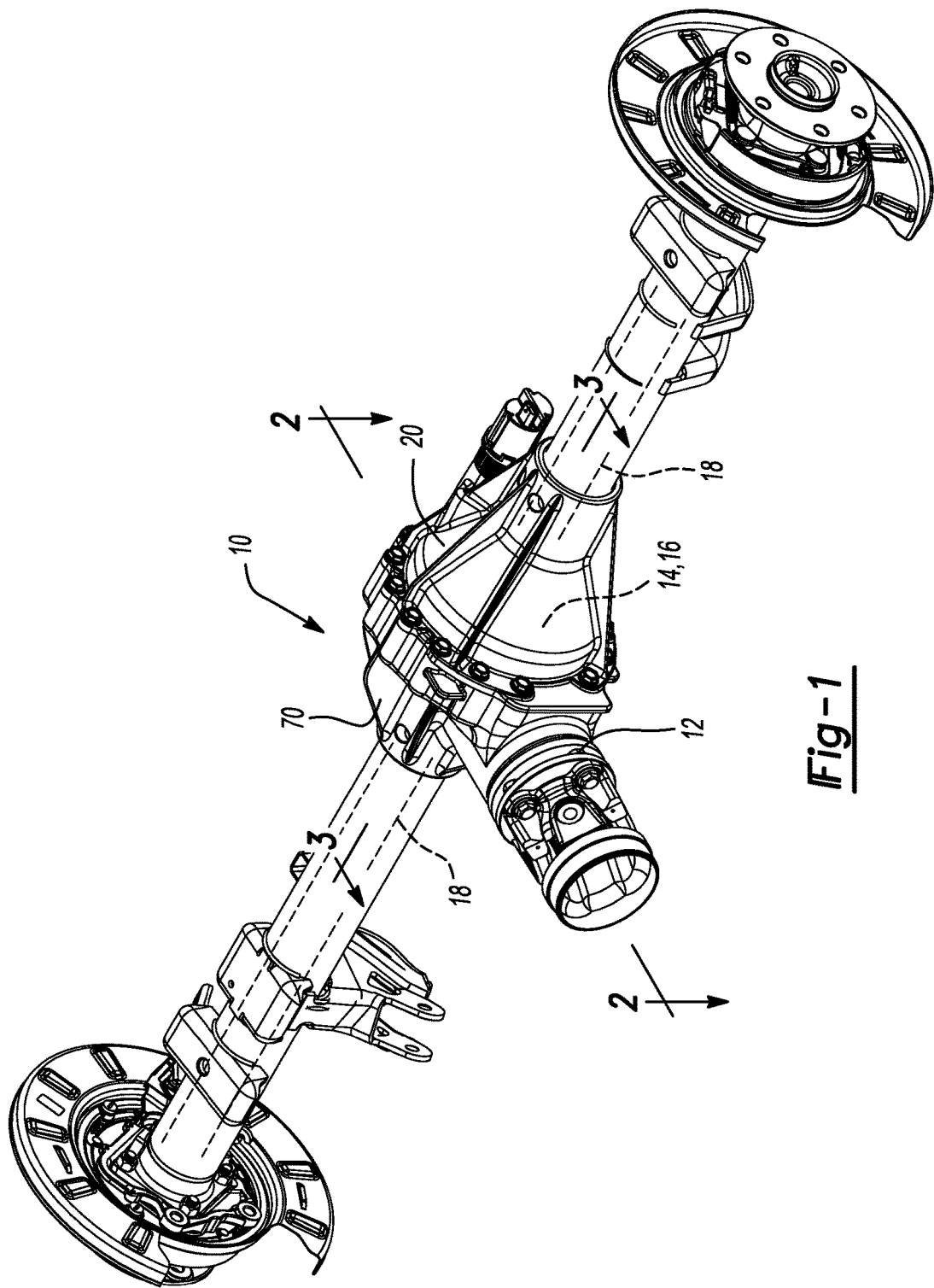
FIG. 1 is a perspective view of an exemplary axle assembly constructed in accordance with the teachings of the present disclosure.
Figure 2:
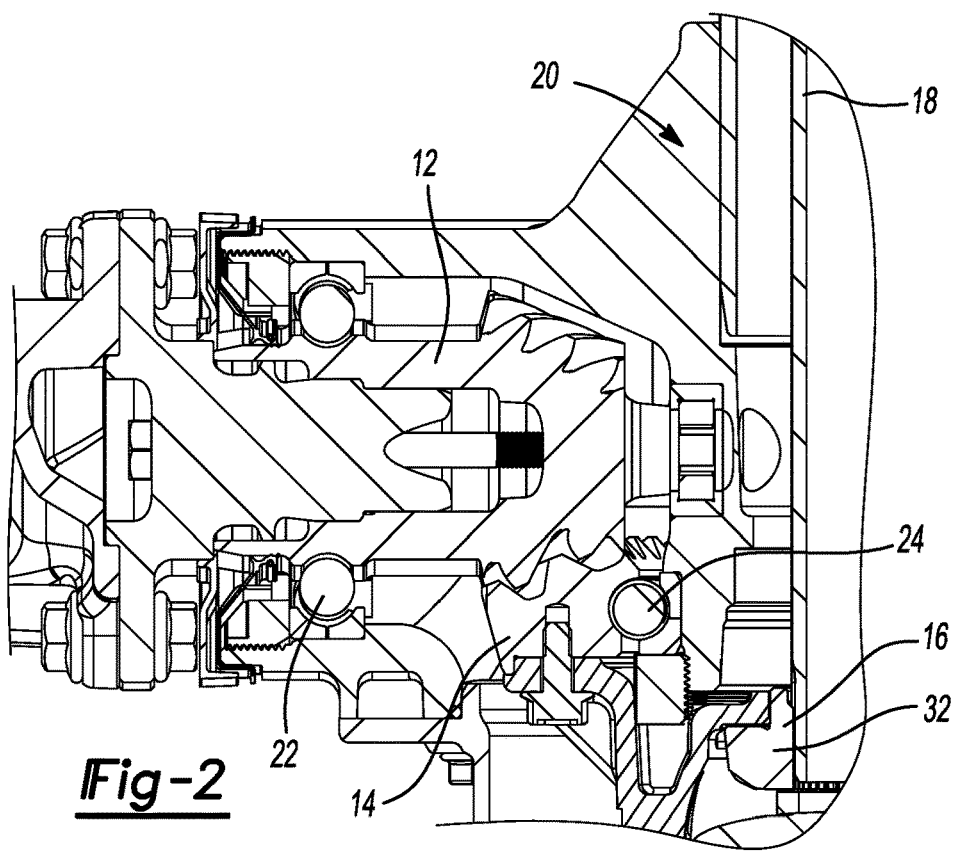
FIG. 2 is a section view taken along the line 2-2 of FIG. 1.
Figure 3:
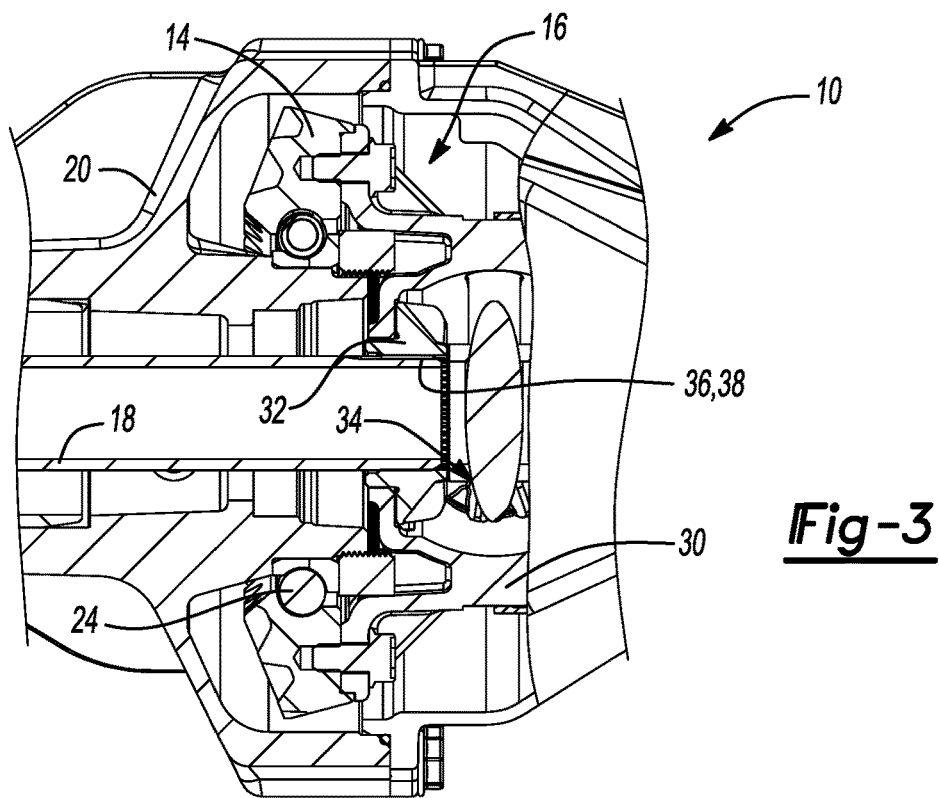
FIG. 3 is a section view taken along the line 3-3 of FIG. 1.

With reference to FIGS. 1 through 3, an exemplary axle assembly constructed in accordance with the teachings of the present disclosure is generally indicated at reference numeral 10. The axle assembly 10 can include an input pinion 12, a ring gear 14, a differential assembly 16, a pair of axle shafts 18 and a housing assembly 20. The input pinion 12 and the ring gear 14 can be housed in the housing assembly 20 in a manner that is described in detail in commonly assigned, co-pending U.S. application Ser. No. 14/205,535 entitled "Axle Assembly", the disclosure of which is incorporated by reference as if fully set forth in detail herein. Briefly, each of the input pinion 12 and the ring gear 14 can be supported for rotation about a respective axis via an angular contact bearing, such as by four-point angular contact bearings 22 and 24, respectively. The input pinion 12 can be meshingly engaged to the ring gear 14 to transmit rotary power there between.

With reference to FIG. 3, the differential assembly 16 can be received in the housing assembly 20 and can include a differential case 30 that can be coupled to the ring gear 14 for common rotation. The differential assembly 16 can have a pair of differential outputs 32 (only one shown), such as the side gears of a differential gearset 34, that can be coupled to a corresponding one of the axle shafts 18 for common rotation. For example, the differential outputs 32 can have a splined aperture 36 into which a splined end 38 of the axle shaft 18 can be received. If desired, the differential case 30 need not be directly supported on the housing assembly 20 by a bearing or other structure for rotation about its axis. It will be appreciated that the axle assembly 10 does not have bearings that are located directly between the housing assembly 20 and the differential case 30 to support the differential case for rotation within the housing assembly 20. Moreover, the axle assembly 10 does not have bearings located deeply inside the housing assembly 20 that support the axle shafts 18 at a location that is proximate the differential assembly 16.

Figure 4:
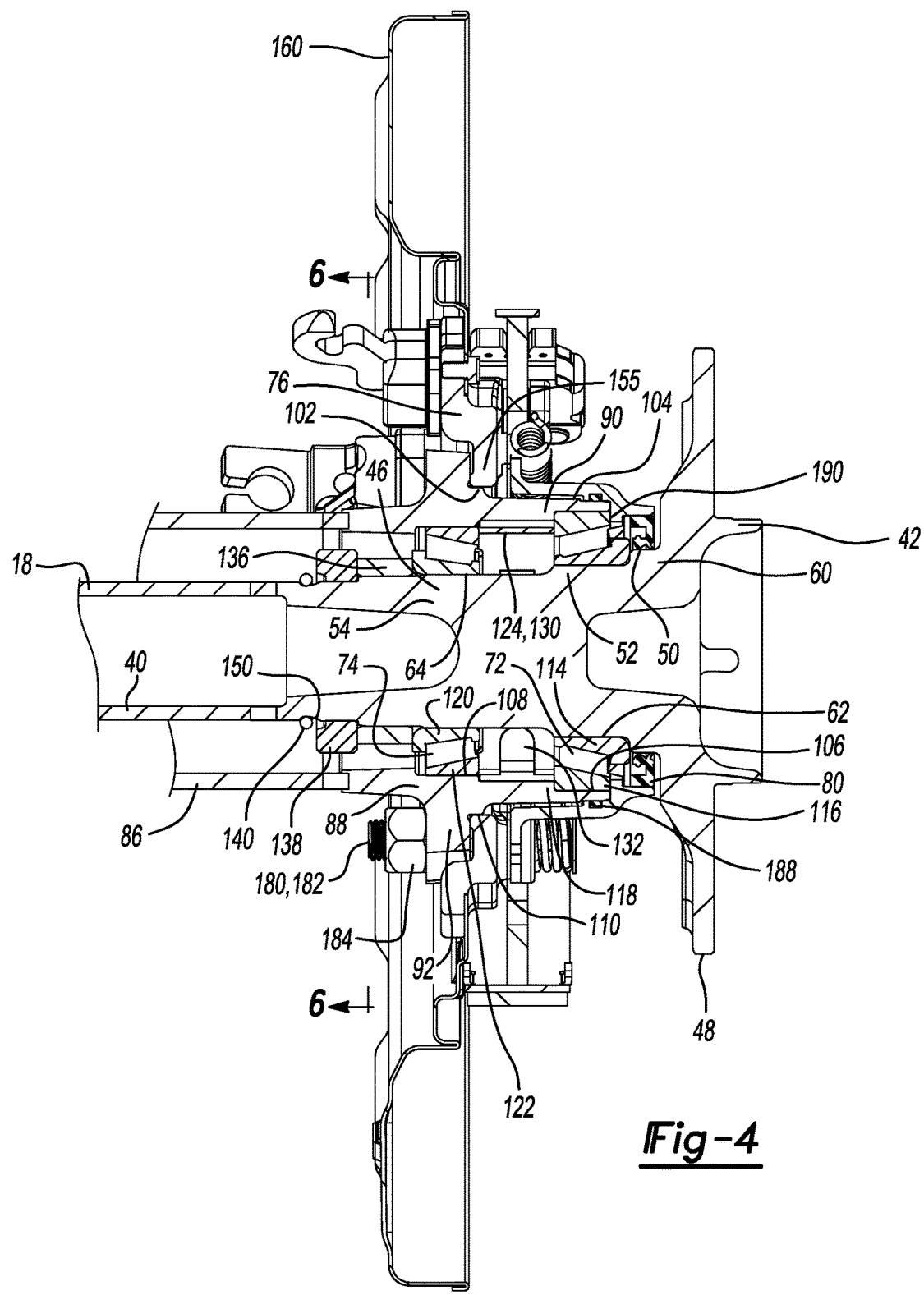
FIG. 4 is a section view taken along the line 4-4 of FIG. 1.

With reference to FIG. 4, each of the axle shafts 18 can comprise a shaft portion 40 and a wheel hub portion 42 that can be fixedly coupled to the shaft portion 40 for common rotation. In the example provided, the shaft portion 40 comprises a tubular shaft segment, the wheel hub portion 42 is a forging, and the wheel hub portion 42 is friction welded to the shaft portion 40. It will be appreciated, however, that the axle shafts 18 could be constructed differently. The wheel hub portion 42 can have a shaft section 46, which can be fixedly coupled to the shaft portion 40, and a wheel flange 48 that can be coupled to the shaft section 46 on a side opposite the shaft portion 40. The shaft section 46 that can define an inner seal surface 50, a first bearing mount 52 and a second bearing mount 54. The inner seal surface 50 can be disposed axially between the wheel flange 48 and the first bearing mount 52 and can be formed on a first shoulder 60. The first bearing mount 52 can be formed on a second shoulder 62 that can be spaced axially between the inner seal surface 50 and the second bearing mount 54. The second bearing mount 54 can be formed on a third shoulder 64. The second shoulder 62 can be smaller in diameter than the first shoulder 60, and the third shoulder 64 can be smaller in diameter than the second shoulder 62.

Figure 5:
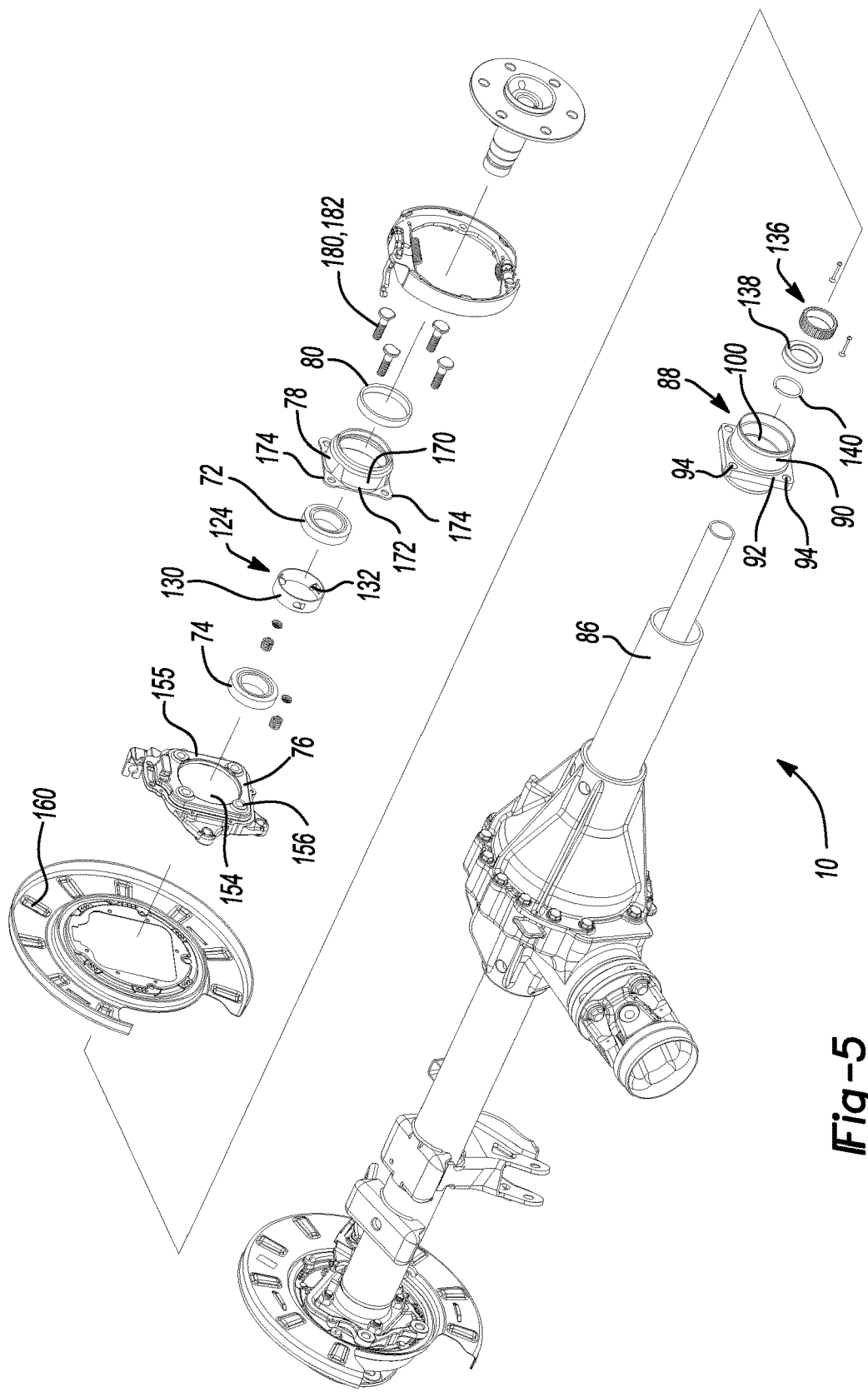
FIG. 5 is a perspective, partly exploded view of the axle assembly of FIG. 1.

With reference to FIG. 5, the housing assembly 20 can comprise an axle housing 70, a pair of first axle bearings 72, a pair of second axle bearings 74, a pair of dust shield mounts 76, a pair of wheel end covers 78 and a pair of seals 80. The axle housing 70 can have a pair of tubular members 86 and a pair of end flanges 88.

With reference to FIGS. 4 and 5, each end flange 88 can be fixedly coupled to one of the tubular members 86 in any desired manner. For example, the end flanges 88 are friction welded to the tubular members 86 in the example provided. It will be appreciated, however, that the end flanges 88 could be unitarily and integrally formed with the tubular members 86, or that any type of coupling means, including welds, adhesives and/or fasteners could be used to couple the end flanges 88 to the tubular members 86. Each of the end flanges 88 can define a hollow central body 90 and a first flange 92 that can extend radially outwardly from the hollow central body 90 and define a plurality of first bolt bosses 94. The hollow central body 90 can define a through bore 100, a first flange mount 102 and an outer surface 104. The through bore 100 can have first and second bearing bore portions 106 and 108, respectively. The first flange mount 102 can have a first annular shoulder 110 and can abut the first flange 92.

Figure 6:
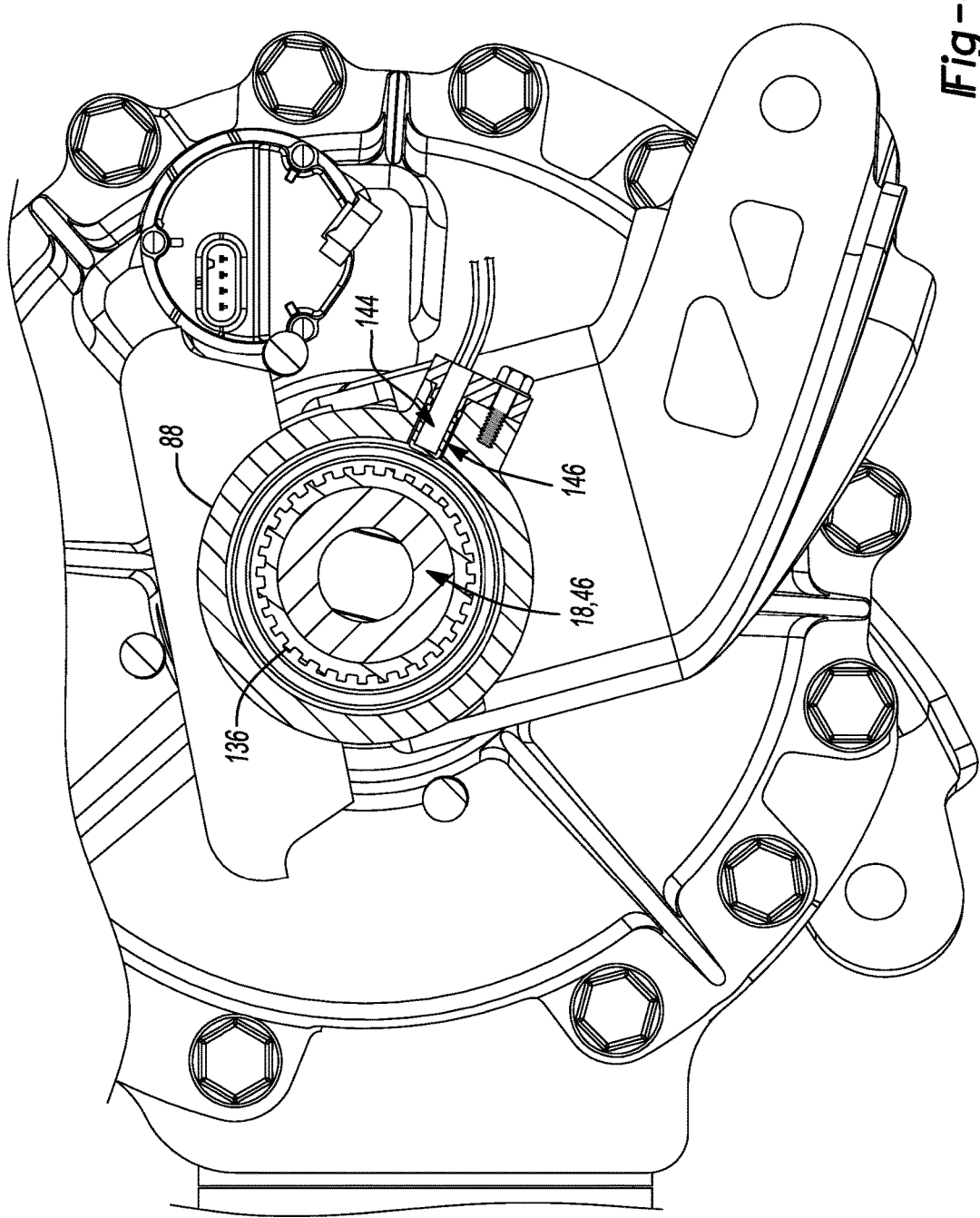
FIG. 6 is a section view taken along the line 6-6 of FIG. 4.

Each of the first axle bearings 72 can be received on the second shoulder 62 of the first bearing mount 52 on a corresponding one of the axle shafts 18 and can be received in the first bearing bore portion 106 of the through bore 100 in a corresponding one of the end flanges 88. The first axle bearings 72 can have an inner bearing race 114, which can be abutted against the first shoulder 60 on the axle shafts 18, and an outer bearing race 116 that can be abutted against a shoulder 118 formed on the end flanges 88. Each of the second axle bearings 74 can be received on the third shoulder 64 of the second bearing mount 54 on a corresponding one of the axle shafts 18 and can be received in the second bearing bore portion 108 of the through bore 100 in a corresponding one of the end flanges 88. The second axle bearings 74 can have an inner bearing race 120 and an outer bearing race 122. A spacer 124 can be received between the outer bearing race 116 of the first axle bearing 72 and the outer bearing race 122 of the second axle bearing 74. The spacer 124 can be configured to transmit load between the outer bearing races 116 and 122 when the first and second axle bearings 72 and 74 are preloaded in the process of assembling the axle assembly 10. The spacer 124 can comprise a hollow cylindrical body 130 and optionally can include a plurality of radial tabs 132 that can extend radially inwardly from the hollow cylindrical body 130 and can touch the outer surface of the axle shaft 18 to center the spacer 124 on the axle shaft 18. A tone wheel 136, a wedding band 138 and a retaining ring 140 can be coupled to each axle shaft 18 and configured to aid in preloading the first and second axle bearings 72 and 74. The tone wheel 136 can be the target of a sensor 144 (FIG. 6) that is configured to sense the rotation of the tone wheel 136 and responsively generate a sensor signal that is indicative of a rotational speed of the axle shaft 18. In the particular example provided, the sensor 144 (FIG. 6) is a Hall-effect sensor and the tone wheel 136 is an annular structure having a plurality of teeth formed on its outer perimeter that are sensed by the sensor 144 as the tone wheel 136 rotates with the axle shaft 18. The tone wheel 136 can be non-rotatably coupled to the axle shaft 18 in any desired manner, such as press-fit onto the shaft section 46. The tone wheel 136 can be abutted against the inner bearing race 120 of the second axle bearing 74. The sensor 144 can be received through a sensor aperture 146 formed in the end flange 88 and can be positioned proximate the tone wheel 136. The wedding band 138 can be an annular structure that can be press-fit to the axle shaft 18 and abutted against the tone wheel 136. The retaining ring 140 can be mounted to a groove 150 formed in the axle shaft 18 and can limit movement of the wedding band 138 in a direction away from the second axle bearing 74.

Each dust shield mount 76 can be a flange-like structure having a bore 154 formed there through that is configured to be received onto the first annular shoulder 110 that is formed on a corresponding one of the end flanges 88. Each dust shield mount 76 can define a flange 155 having a plurality of second bolt bosses 156 that can be aligned to the first bolt bosses 94 on the first flange 92 of a corresponding one of the end flanges 88. The dust shield mounts 76 are configured to mount a dust shield 160 to a corresponding one of the end flanges 88. In the particular example provided, the dust shields 160 and the dust shield mounts 76 are formed as discrete components that are assembled together to provide modularity in the design that permits the use of several differently sized dust shields to be mounted to a common axle housing 70. It will be appreciated, however, that the dust shields 160 could be unitarily and integrally formed with the dust shield mounts 76.

Each of the wheel end covers 78 be coupled to a corresponding one of the end flanges 88. Each of the wheel end covers 78 can have an annular body 170 and a second flange 172 that can extend radially outwardly from the annular body 170. The second flange 172 can define a plurality of third bolt bosses 174 that can be aligned to the first and second bolt bosses 94 and 156. Threaded fasteners 180 can be received through the first, second and third bolt bosses 94, 156 and 174 and can exert a clamping force that couples the second flange 172, the dust shield mount 76 and the first flange 92 together. In the particular example provided, the threaded fasteners comprise studs 182, which are press-fit into the third bolt bosses 174, and a plurality of nuts 184 that are engaged to the studs 182 on a side of the first flange 92 that is opposite the side to which the dust shield mount 76 is engaged. The annular body 170 can be slidably received over the hollow central body 90 of the end flange 88. Optionally, the annular body 170 can carry a seal 188 that can be sealingly engaged to the outer surface 104 that is formed on the hollow central body 90. Also optionally, the annular body 170 can define an inwardly projecting rib 190 can be abutted against the outer bearing race 116 of the first axle shaft bearing 72. Placement of the inwardly projecting rib 190 axially in-line with the outer bearing race 116 of the first axle bearing 72 prevents the outer bearing race 116 from being withdrawn from the end flange 88 without removal of the wheel end cover 78 from the axle housing 70.

The seal 80 can be coupled to the wheel end cover 78 and can sealingly engage the inner seal surface 50 formed on the wheel hub portion 42 of the axle shaft 18. In the particular example provided, the seal 80 is a lip seal that is formed as a discrete component and assembled to the wheel end cover 78 so as to abut the inwardly projecting rib 190 on an axial side that is opposite the outer bearing race 116 of the first axle shaft bearing 72. Alternatively, the seal 80 could be molded onto (i.e., cohesively bonded to) the wheel end cover 78.

To assemble the axle assembly 10, the following assembly method may be utilized: providing a tubular member 86; coupling a tube end connector 88 to the tubular member 86; installing a radial seal 80 to a wheel end cover 78; installing the wheel end cover 78 to an axle shaft 18 such that the radial seal 80 sealingly engages an inner seal surface 50 formed on the axle shaft 18; installing first and second axle bearings 72 and 74 onto the axle shaft 18; mounting a dust shield mount 76 to a first annular shoulder 110 formed on the tube end connector 88; and installing the axle shaft 18 through the tube end connector 88 and the tubular member 86 such that the first and second axle bearings 72 and 74 are seated into the tube end connector 88 and the flange 155 on the dust shield mount 76 abuts flanges 172 and 92 formed on the wheel end cover 78 and the tube end connector 88.

Figure 7:
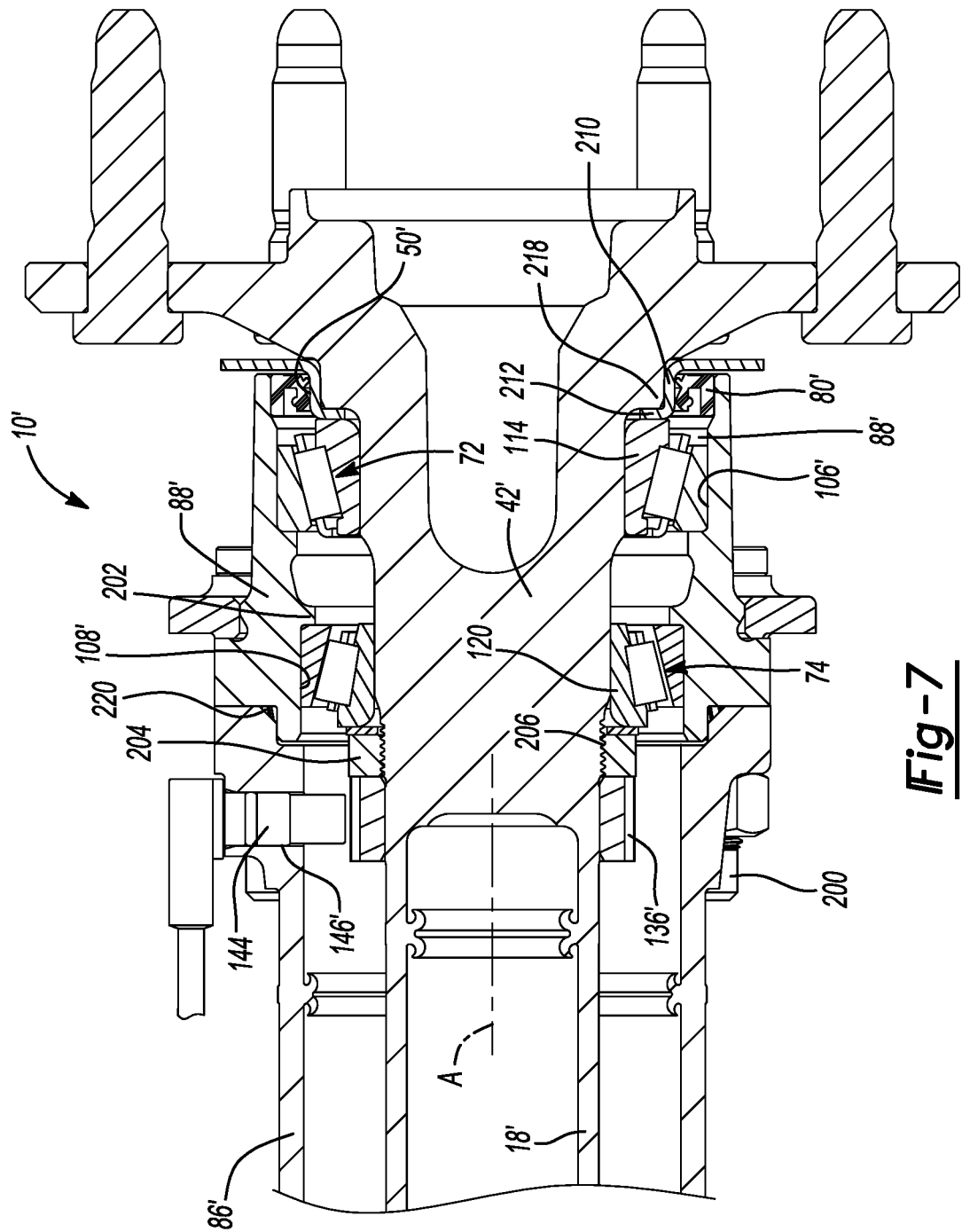
FIG. 7 is a longitudinal section view of a portion of another axle assembly constructed in accordance with the teachings of the present disclosure.

With reference to FIG. 7, another axle assembly constructed in accordance with the teachings of the present disclosure is generally indicated by reference numeral 10'. The axle assembly 10' can be generally similar to the axle assembly 10 of FIG. 1, except that a plurality of threaded fasteners 200 can be employed to fixedly but removably couple the end flange 88' to a distal end of the tubular member 86'.

In this example, the second bearing bore portion 108' in the end flange 88' intersects an annular shoulder 202 on an end of the second bore portion 108' that faces toward the first bearing bore portion 106', a threaded nut 204 is engaged to threads 206 formed on the wheel hub portion 42' of the axle shaft 18', the tone wheel 136' is coupled to (e.g., unitarily and integrally formed with) the threaded nut 204, the seal 80' is directly mounted to the end flange 88', and the inner seal surface 50' is formed on a seal journal 210 that is fixedly coupled to the wheel hub portion 42'. A radially inwardly extending flange 212 on the seal journal 210 can be disposed between the inner bearing race 114 of the first axle bearing 72 can and a shoulder 218 on the wheel hub portion 42'. The threaded nut 204 can be tightened on the axle shaft 18' to drive the inner bearing race 120 of the second axle bearing 74 toward the first axle bearing 72, which causes the inner bearing race 114 of the first axle bearing 72 to abut the radially inwardly extending flange 212 on the seal journal 210 and to drive the radially inwardly extending flange 212 into abutment with the shoulder 218 on the wheel hub portion 42' as the tapered rollers of the first and second axle bearings 72 and 74 are preloaded along the rotary axis A of the axle shaft 18'. A seal member 220, such as an O-ring, can be disposed between the tubular member 86' and the end flange 88'. The sensor 144 can be received through a sensor aperture 146' that is formed through the tubular member 86'.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An axle assembly comprising:
an axle housing having a tubular member and an end flange that is fixedly coupled to the tubular member, the end flange defining a first bearing bore and a second bearing bore;
a ring gear received in the housing and rotatable about a rotary axis;
a ring gear bearing that directly supports the ring gear for rotation about the rotary axis;
a differential assembly received in the axle housing, the differential assembly having a pair of differential output members;
an axle shaft received thorough the end flange and extending into the tubular member, the axle shaft having a proximal end, which is drivingly engaged to one of the differential output members, and a distal end opposite the proximal end, the distal end comprising a first bearing journal, a second bearing journal, a seal interface and a wheel flange, the first bearing journal being disposed along the rotary axis between the second bearing journal and the seal interface, the wheel flange being adapted to abut a wheel that is mounted to the axle shaft for rotation therewith, the seal interface being disposed along the rotary axis between the wheel flange and the first bearing journal;
first and second tapered roller bearings, the first tapered roller bearing being received in the first bearing bore and on the first bearing journal, the second tapered roller bearing being received in the second bearing bore and on the second bearing journal, the first and second tapered roller bearings supporting the distal end of the axle shaft relative to the end flange for rotation about the rotary axis; and
a seal fixedly coupled to the end flange and engaging the seal interface on the axle shaft;
wherein the second bearing journal has a diameter that is smaller than a diameter of the first bearing journal.

2. The axle assembly of claim 1, further comprising a rotational speed sensor that is received through a hole in the tubular member and fixedly coupled to the tubular member.

3. The axle assembly of claim 2, further comprising a tone wheel coupled to the axle shaft for rotation therewith.

4. An axle assembly comprising:
an axle housing having a tubular member and an end flange that is fixedly coupled to the tubular member, the end flange defining a first bearing bore and a second bearing bore;
a ring gear received in the housing and rotatable about a rotary axis;
a ring gear bearing that directly supports the ring gear for rotation about the rotary axis;
a differential assembly received in the axle housing, the differential assembly having a pair of differential output members;
an axle shaft received thorough the end flange and extending into the tubular member, the axle shaft having a proximal end, which is drivingly engaged to one of the differential output members, and a distal end opposite the proximal end, the distal end comprising a first bearing journal, a second bearing journal, a seal interface and a wheel flange, the first bearing journal being disposed along the rotary axis between the second bearing journal and the seal interface, the wheel flange being adapted to abut a wheel that is mounted to the axle shaft for rotation therewith, the seal interface being disposed along the rotary axis between the wheel flange and the first bearing journal;
first and second tapered roller bearings, the first tapered roller bearing being received in the first bearing bore and on the first bearing journal, the second tapered roller bearing being received in the second bearing bore and on the second bearing journal, the first and second tapered roller bearings supporting the distal end of the axle shaft relative to the end flange for rotation about the rotary axis;
a seal fixedly coupled to the end flange and engaging the seal interface on the axle shaft; and
a dust shield mount fixedly coupled to the end flange.

5. The axle assembly of claim 4, further comprising a rotational speed sensor that is received through a hole in the tubular member and fixedly coupled to the tubular member.

6. The axle assembly of claim 5, further comprising a tone wheel coupled to the axle shaft for rotation therewith.

7. An axle assembly comprising:
an axle housing having a tubular member and an end flange that is fixedly coupled to the tubular member, the end flange defining a first bearing bore and a second bearing bore;
a ring gear received in the housing and rotatable about a rotary axis;
a ring gear bearing that directly supports the ring gear for rotation about the rotary axis;
a differential assembly received in the axle housing, the differential assembly having a pair of differential output members;
an axle shaft received thorough the end flange and extending into the tubular member, the axle shaft having a proximal end, which is drivingly engaged to one of the differential output members, and a distal end opposite the proximal end, the distal end comprising a first bearing journal, a second bearing journal, a seal interface and a wheel flange, the first bearing journal being disposed along the rotary axis between the second bearing journal and the seal interface, the wheel flange being adapted to abut a wheel that is mounted to the axle shaft for rotation therewith, the seal interface being disposed along the rotary axis between the wheel flange and the first bearing journal;
first and second tapered roller bearings, the first tapered roller bearing being received in the first bearing bore and on the first bearing journal, the second tapered roller bearing being received in the second bearing bore and on the second bearing journal, the first and second tapered roller bearings supporting the distal end of the axle shaft relative to the end flange for rotation about the rotary axis;
a seal fixedly coupled to the end flange and engaging the seal interface on the axle shaft; and
a dust shield fixedly coupled to the end flange.

8. The axle assembly of claim 7, further comprising a rotational speed sensor that is received through a hole in the tubular member and fixedly coupled to the tubular member.

9. The axle assembly of claim 8, further comprising a tone wheel coupled to the axle shaft for rotation therewith.

10. An axle assembly comprising:
an axle housing having a tubular member and an end flange that is fixedly coupled to the tubular member, the end flange defining a first bearing bore and a second bearing bore;
a ring gear received in the housing and rotatable about a rotary axis;
a ring gear bearing that directly supports the ring gear for rotation about the rotary axis;
a differential assembly received in the axle housing, the differential assembly having a pair of differential output members;
an axle shaft received thorough the end flange and extending into the tubular member, the axle shaft having a proximal end, which is drivingly engaged to one of the differential output members, and a distal end opposite the proximal end, the distal end comprising a first bearing journal, a second bearing journal, a seal interface and a wheel flange, the first bearing journal being disposed along the rotary axis between the second bearing journal and the seal interface, the wheel flange being adapted to abut a wheel that is mounted to the axle shaft for rotation therewith, the seal interface being disposed along the rotary axis between the wheel flange and the first bearing journal;
first and second tapered roller bearings, the first tapered roller bearing being received in the first bearing bore and on the first bearing journal, the second tapered roller bearing being received in the second bearing bore and on the second bearing journal, the first and second tapered roller bearings supporting the distal end of the axle shaft relative to the end flange for rotation about the rotary axis;
a seal fixedly coupled to the end flange and engaging the seal interface on the axle shaft; and
a retainer fixedly coupled to the axle shaft, the retainer inhibiting movement of an inner bearing race of the second tapered roller bearing along the rotary axis in a direction away from the first tapered roller bearing.

11. The axle assembly of claim 10, wherein the retainer comprises a ring that is grippingly engaged to the axle shaft.

12. The axle assembly of claim 10, wherein the retainer this threadably coupled to the axle shaft.

13. The axle assembly of claim 12, further comprising a tone ring fixedly coupled to the retainer.

14. The axle assembly of claim 10, further comprising a rotational speed sensor that is received through a hole in the tubular member and fixedly coupled to the tubular member.

15. The axle assembly of claim 14, further comprising a tone wheel coupled to the axle shaft for rotation therewith.

16. An axle assembly comprising:
an axle housing having a tubular member and an end flange that is fixedly coupled to the tubular member, the end flange defining a first bearing bore and a second bearing bore;
a ring gear received in the housing and rotatable about a rotary axis;
a ring gear bearing that directly supports the ring gear for rotation about the rotary axis;
a differential assembly received in the axle housing, the differential assembly having a pair of differential output members;
an axle shaft received thorough the end flange and extending into the tubular member, the axle shaft having a proximal end, which is drivingly engaged to one of the differential output members, and a distal end opposite the proximal end, the distal end comprising a first bearing journal, a second bearing journal, a seal interface and a wheel flange, the first bearing journal being disposed along the rotary axis between the second bearing journal and the seal interface, the wheel flange being adapted to abut a wheel that is mounted to the axle shaft for rotation therewith, the seal interface being disposed along the rotary axis between the wheel flange and the first bearing journal;
first and second tapered roller bearings, the first tapered roller bearing being received in the first bearing bore and on the first bearing journal, the second tapered roller bearing being received in the second bearing bore and on the second bearing journal, the first and second tapered roller bearings supporting the distal end of the axle shaft relative to the end flange for rotation about the rotary axis;
a seal fixedly coupled to the end flange and engaging the seal interface on the axle shaft; and
a seal member disposed between the tubular member and the end flange.

17. The axle assembly of claim 16, further comprising a rotational speed sensor that is received through a hole in the tubular member and fixedly coupled to the tubular member.

18. The axle assembly of claim 17, further comprising a tone wheel coupled to the axle shaft for rotation therewith.

19. A method for assembling an axle assembly, the method comprising:
providing an axle housing having a tubular member;
mounting a differential assembly in the axle housing for rotation about a rotary axis;
providing an axle shaft having a wheel flange formed thereon;
assembling a first inner bearing race to the axle shaft;
providing an end flange;
installing a set of first tapered rollers, a first outer bearing race, a set of second tapered rollers, and a second outer bearing race to the end flange;
assembling the end flange to the axle shaft such that first set of tapered rollers are engaged to the first inner and outer bearing races;
assembling a second inner bearing race to the axle shaft such that the set of second tapered rollers are disposed between the second inner and outer bearing races;
axially preloading the set of first tapered rollers and the set of second tapered rollers;
inserting the axle shaft into the tubular member to engage an end of the axle shaft to an output member of the differential assembly and to abut the end flange to the tubular member; and
fixedly coupling the end flange to the tubular member.

20. The method of claim 19, wherein axially preloading the set of first tapered rollers and the set of second tapered rollers comprises threading a nut onto the axle shaft.

21. The method of claim 20, wherein a tone ring is fixedly coupled to the nut.

22. The method of claim 19, wherein prior to assembling the end flange to the axle shaft the method further comprises mounting a seal to the end flange and wherein the seal sealingly engages a seal interface on the axle shaft when the end flange is assembled to the axle shaft.

* * * * *